R. CROMPTON & J. R. FITTON.
LOOM.
APPLICATION FILED DEC. 23, 1907.
934,047.
Patented Sept. 14, 1909.
5 SHEETS—SHEET 1.
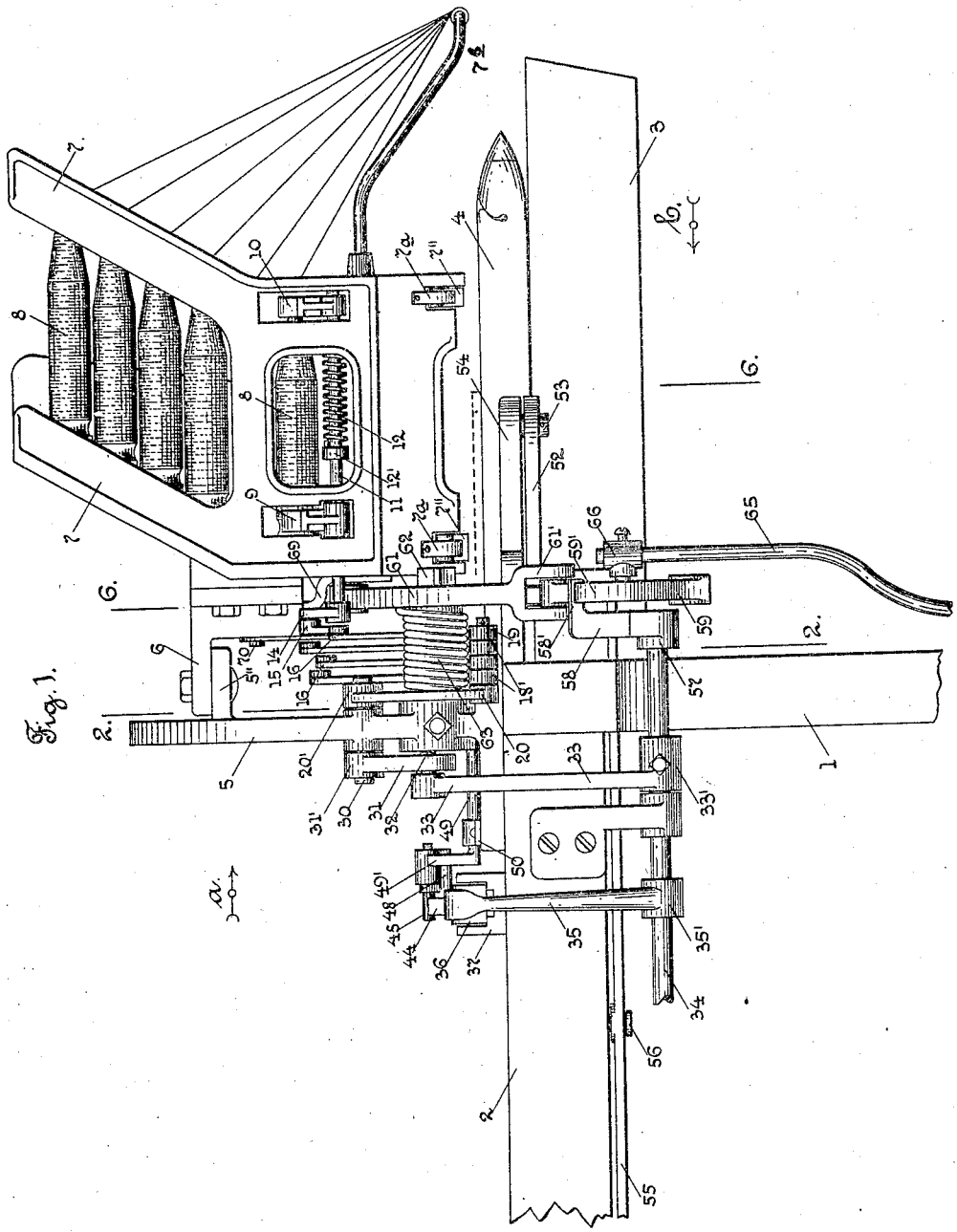
Witnesses
M. Bredt.
M. Haas.
Inventors
R. Crompton
J. R. Fitton.
By 
Attorney.

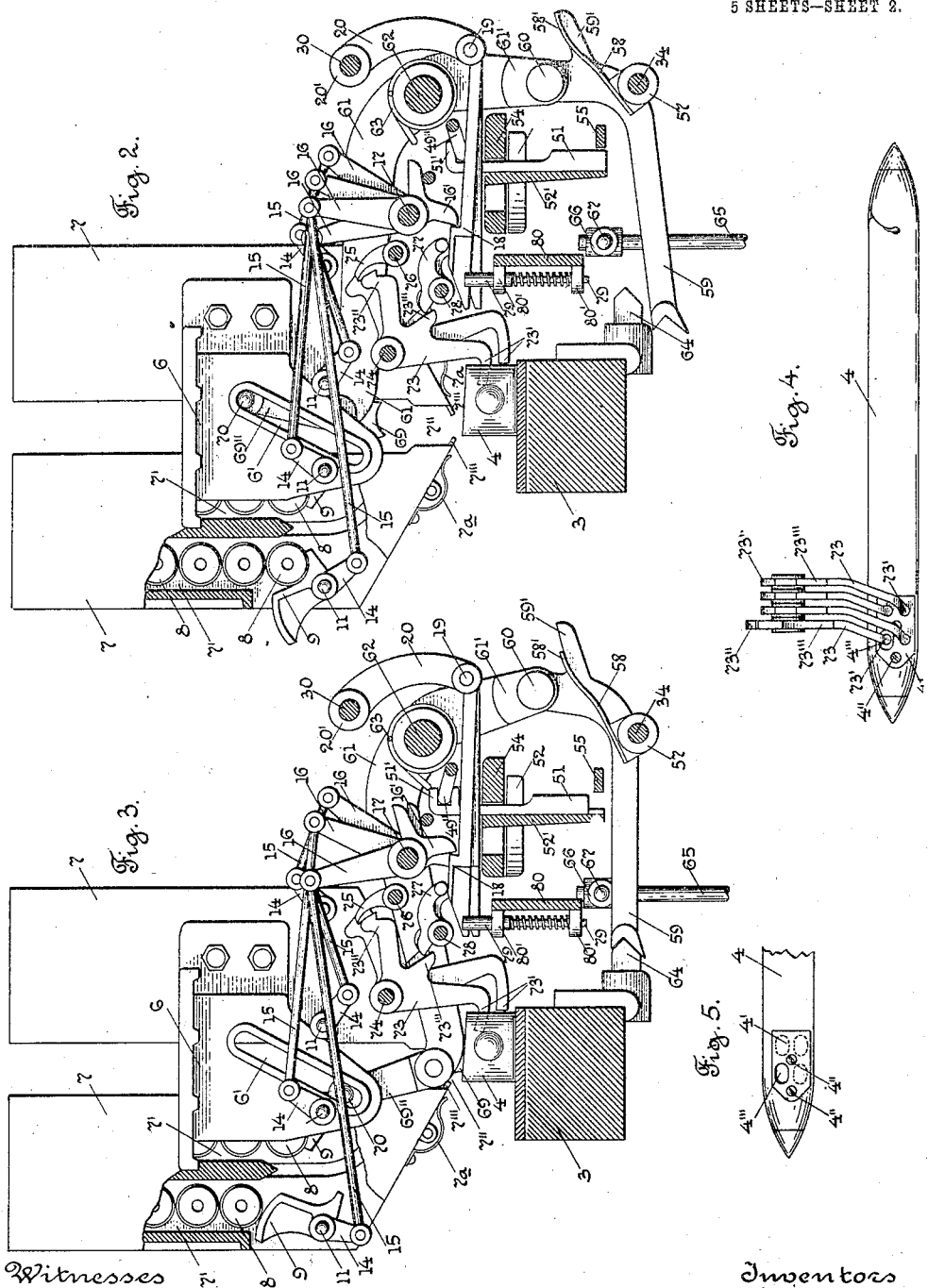

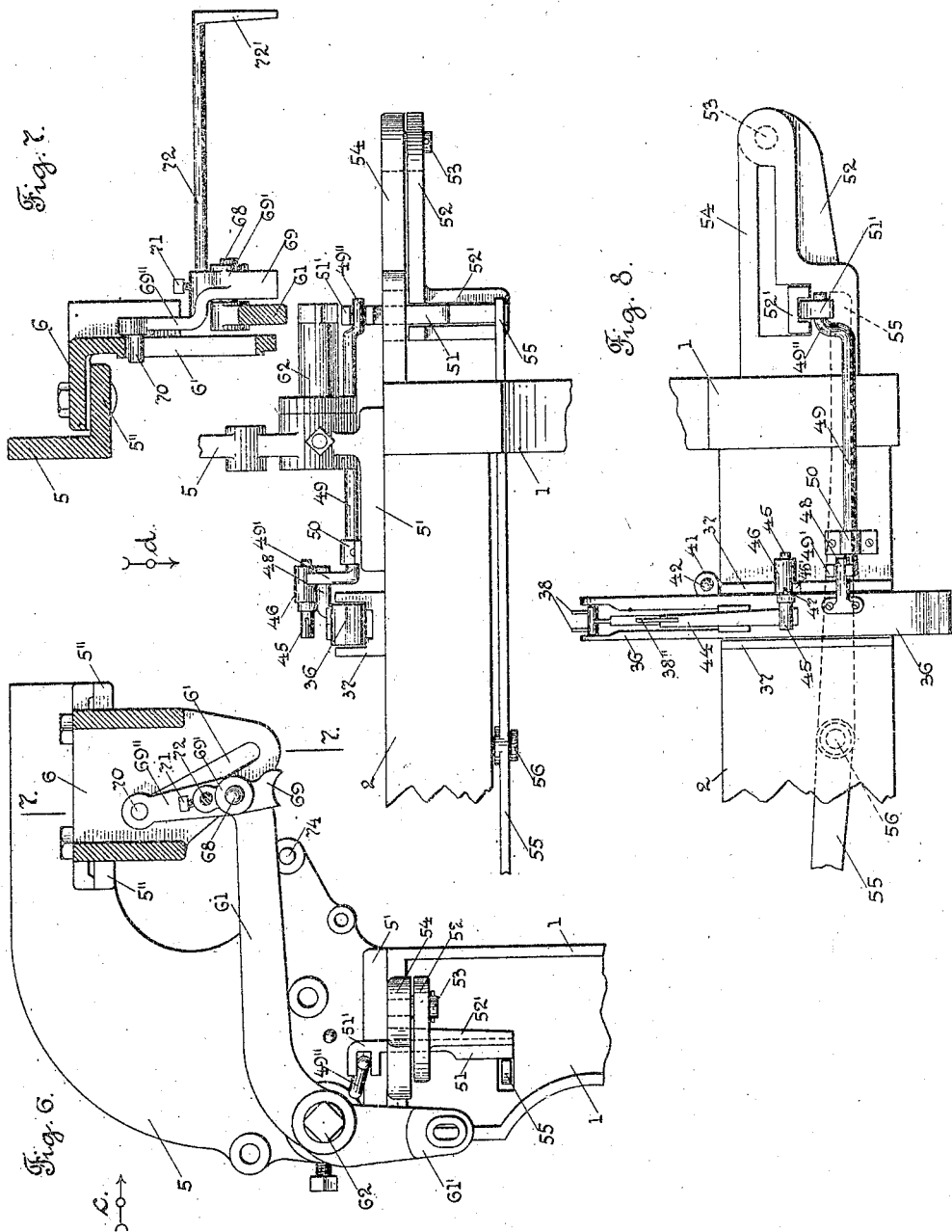

R. CROMPTON & J. R. FITTON.
LOOM.
APPLICATION FILED DEC. 23, 1907.
934,047.
Patented Sept. 14, 1909.
5 SHEETS—SHEET 4.
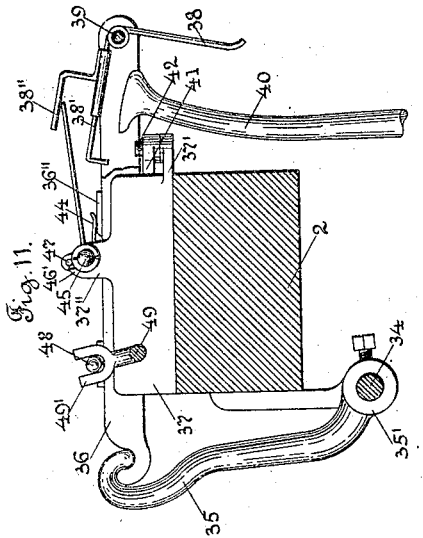
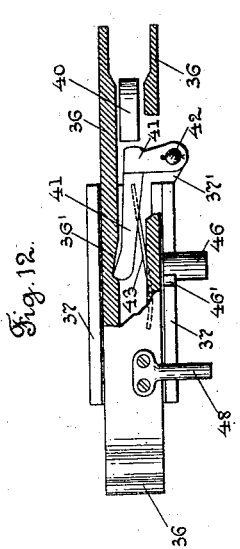
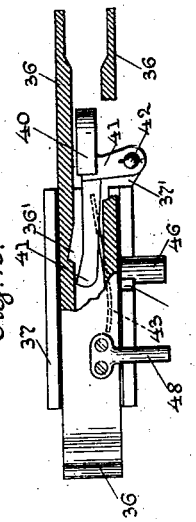
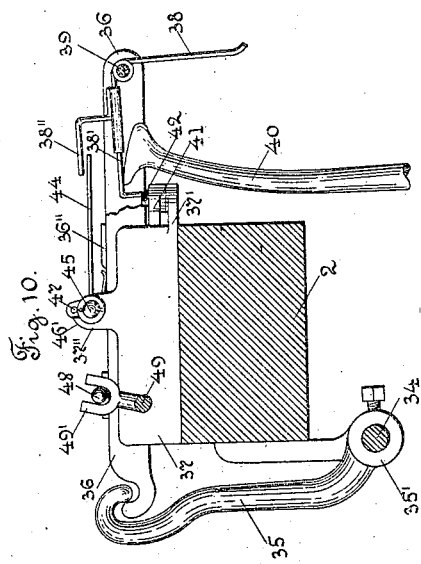
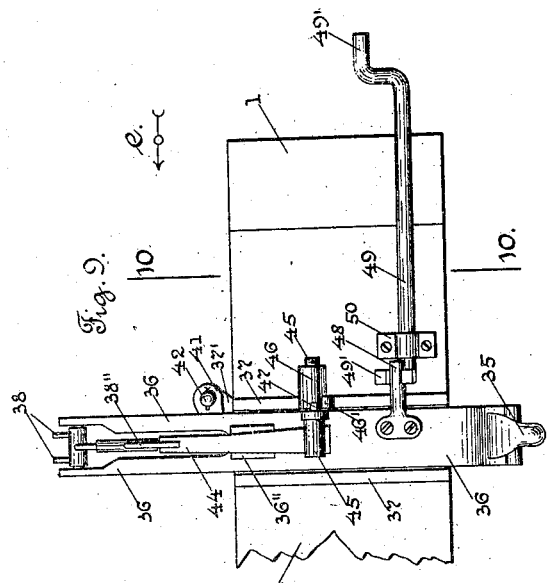
Witnesses
M. Bredt.
M. Haas.
Inventors
R. Crompton
J. R. Fitton.
By John C. Dewey
Attorney.

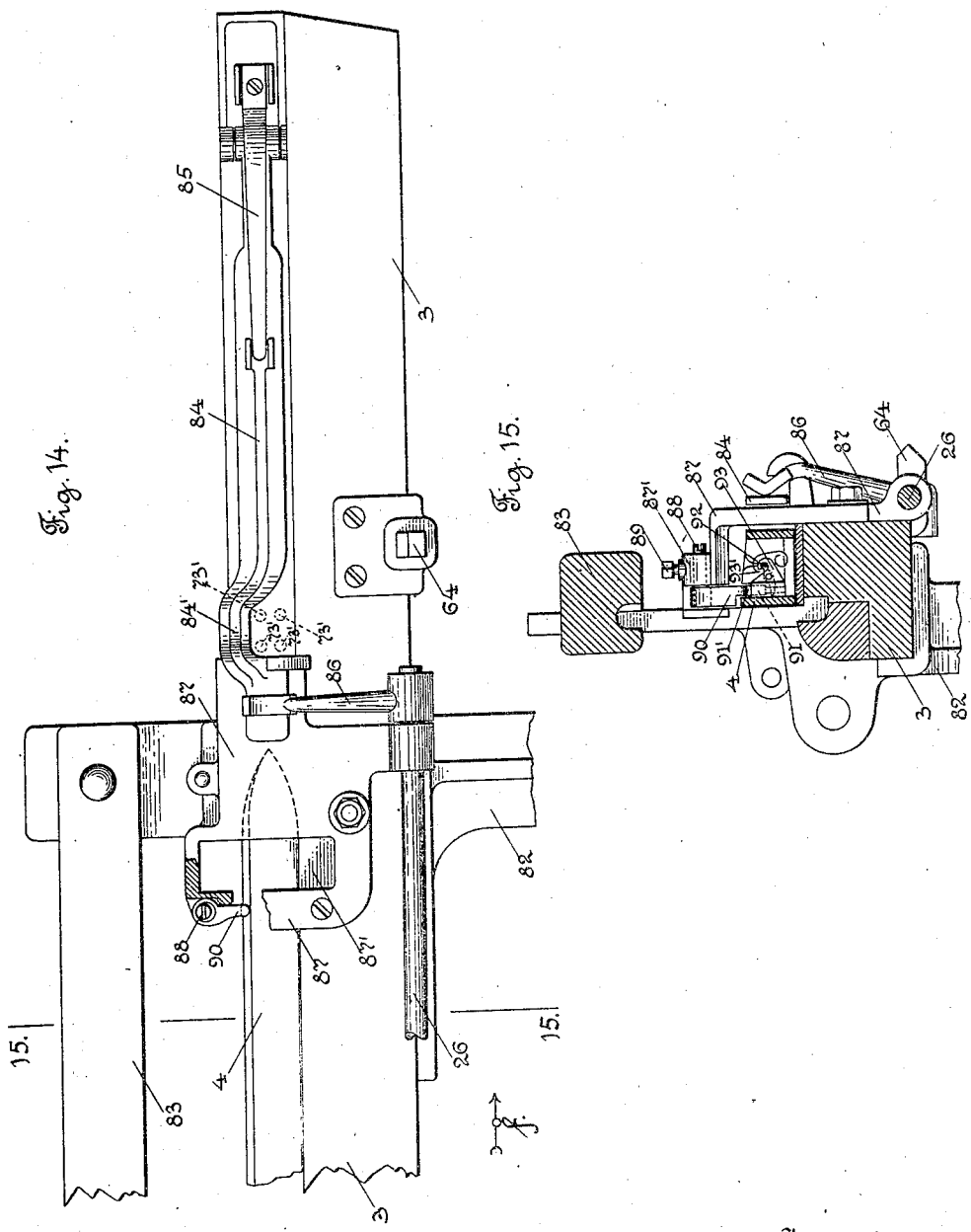

# UNITED STATES PATENT OFFICE.

RANDOLPH CROMPTON AND JOHN R. FITTON, OF WORCESTER, MASSACHUSETTS, ASSIGNORS TO CROMPTON & KNOWLES LOOM WORKS, A CORPORATION OF MASSACHUSETTS.

LOOM.

934,047.  Specification of Letters Patent.  Patented Sept. 14, 1909.

Application filed December 23, 1907. Serial No. 407,765.

*To all whom it may concern:*

Be it known that we, RANDOLPH CROMPTON and JOHN R. FITTON, citizens of the United States, residing at Worcester, in the county of Worcester and State of Massachusetts, have jointly invented certain new and useful Improvements in Looms, of which the following is a specification.

This invention relates to plain and shifting shuttle box looms, and more particularly to automatic looms of the class shown and described in United States Letters Patents, No. 529,940, and No. 600,053; wherein the filling carriers are automatically changed without stopping the loom.

The object of our invention is to provide novel means to cause the filling carriers to be automatically changed before the same have become completely exhausted, and to overcome various objectionable features in mechanisms which have been devised for this purpose, and to obtain improved and more perfect results in the operation of the loom.

Prior to our invention automatic looms using one or more shuttles have been supplied with measuring mechanisms, arranged to indicate for a change of the filling carriers after a filling carrier has been thrown or picked across the loom a predetermined number of times, as shown and described in United States Letters Patents, No. 462,919, and No. 600,121. Detecting mechanisms or feeling devices have also been employed in automatic looms using one or more shuttles, arranged to feel on the wound filling mass to detect the approaching exhaustion of the filling, as shown and described in United States Letters Patents, No. 527,014, and No. 692,932.

The two broad principles involved in the Letters Patents above referred, to cover the various mechanisms found in the present state of the art, In this present invention the filling which is being woven into the goods is neither measured, nor tested by a feeler, and we therefore do not mean to claim the same, but as our invention is of a novel construction and involves a new principle, consisting broadly in devices acting inside the shuttle, which operate to disconnect the filling from its source of supply, after a full shot or pick of filling has been laid in the shed, substantially at the selvage of the fabric, and at a point, in the withdrawal of the filling from the carrier, when a previously arranged reverse wind is reached, at which time devices are moved to cause a fresh filling carrier to be substituted for the carrier containing the reversed wound filling, thus leaving a predetermined amount of waste to a given pick.

We are the first to disconnect the trail of the filling from its source of supply in the shuttle, after the shuttle has laid a full pick in the shed, at a point in the unwinding which leaves a predetermined amount of waste to a single pick, and have, by the novel mechanism of our invention, obtained a perfect and unvarying result, which in the previous inventions showing measuring mechanisms, and feeler mechanisms, both of which inventions we have above referred to, have been impossible to obtain.

We have shown in the drawings, a bobbin changing mechanism, but it will be understood that our invention is intended to cover a loom employing any well known form of filling changing mechanism, and while we have shown a loom having a shuttle box which is actuated vertically, and which contains four cells, it would not depart from our invention to use a circularly moving box with two or six cells, or a single stationary shuttle box may be used at the same end of the loom, which is herein supplied with the shifting or drop shuttle boxes, as the manner of placing the shuttle before the picker has no bearing on our invention.

We have only shown in the drawings detached portions of a loom, of the class referred to, with a magazine and weft replenishing mechanism, and other parts, sufficient to enable those skilled in the art to understand the construction and operation thereof.

Referring to the drawings:—Figure 1 is a front view of a detached portion of the right hand end of a loom, with our improvements thereon. Fig. 2 is a section, on line 2, 2, Fig. 1, looking in the direction of arrow *a*, same figure; the rear portion of the magazine is partially broken away. Fig. 3 corresponds to Fig. 2, but shows some of the parts in a different position. Fig. 4 shows a shuttle, and the indicating levers, detached. Fig. 5 shows one end of the shuttles with the plate thereon. Fig. 6 is a section, on line 6, 6, Fig. 1, looking in the direction of arrow *b*, same figure, showing the transferrer arm, and shipper lever stand; the other parts are left off in this figure. Fig. 7 is a section, on line 7, 7, Fig. 6, looking in the direction of arrow c, same figure, showing the transferrer arm in section, and the side stop motion slide. Fig. 8 is a plan view of the side stop motion, looking in the direction of arrow d, Fig. 7; the stand shown in Fig. 7 is left off in this figure. Fig. 9 is, on an enlarged scale, a plan view of the side stop motion shown in Fig. 8. Fig. 10 is a section, on line 10, 10, Fig. 9, looking in the direction of arrow e, same figure. Fig. 11 corresponds to Fig. 10, but shows some of the parts in another position. Fig. 12 is a sectional plan view of the slide shown in Fig. 10, with some of the parts removed. Fig. 13 corresponds to Fig. 12, but shows a different position of some of the parts. Fig. 14 is a front view of the right hand end of the lay, detached, with some parts broken away, and showing the shuttle on the lay, preparatory to entering the box, and, Fig. 15 is a section, on line 15, 15, Fig. 14, looking in the direction of arrow f, same figure.

In the accompanying drawings, 1 is a detached portion of a loom side or end frame, 2 is the breast beam, 3 is the lay, and 4 a shuttle. A stationary stand 5 has a foot 5' secured upon the upper side of the loom frame and the breast beam, at the end thereof, and forms a rigid support for the several parts of the indicating and transferring mechanism. To a side extension 5'' on the stand 5 is in this instance secured an intermediate stand 6, and to the stand 6 is in this instance secured the stationary magazine 7, having in this instance four compartments 7' for bobbins or filling carriers 8 the lower part of the magazine and the compartments therein, extending in a perpendicular plane, and the upper part of the magazine and the compartments therein, extending in an inclined plane relative to the lower part, to hold the heads and tips of the bobbins in said inclined parts out of line with each other in the direction of the length of the bobbins. The upper part of the magazine is in this instance made inclined outwardly relative to the length of the loom, as shown in Fig. 1, and the bobbins move down in their compartments by gravity. The lowest bobbin in each compartment rests in this instance on two supports or rocking levers 9, and 10, one support or lever as 9, for the head of the bobbin, and the other as 10, for the tip of the bobbin. Each support or lever 9 and 10 has a concave recessed portion in which the bobbin rests and is supported, as shown in Fig. 2, and also has a convexed portion on its end, which is adapted to pass under the bobbin above the lowest bobbin, after the lowest bobbin has been discharged, to support the series of bobbins, as shown in Fig. 3. The pair of supports 9 and 10 are in this instance fast on a rock shaft 11, which has suitable bearings in the lower part of the magazine 7. The supports 9 and 10 are yieldingly held in their operative position to support the bobbins, in this instance by a helically coiled torsion spring 12, encircling the shaft 11, and attached at one end to a collar 12' on said shaft, and at its other end to the magazine.

The lower ends of the compartments 7' of the magazine 7, in this instance converge toward a central discharge opening 7'', as is customary, and when the supporting arms 9 and 10, are moved to release a bobbin, the bobbin passes down to the discharging end 7'' of the magazine 7, and is yieldingly held there, at its head and tip end, by blades or plates 7''', and springs 7ª, see Fig. 2, or other suitable devices, as is customary, until the transferrer arm operates to engage and carry the bobbin down into the shuttle.

We will now describe the mechanism for operating the bobbin supports or rocking levers 9 and 10. It will be understood, as above stated, that there are a pair of supports or rocking levers 9 and 10 at the lower end of each compartment, for supporting the superimposed bobbins in the compartments, and the mechanism for operating one pair of supports is a duplicate of the mechanism for operating the other pairs of supports, and therefore it is only necessary to describe the mechanism for operating one pair of supports, and similar figures of reference are used on similar parts. The rocking shaft 11 has in this instance on its inner end an arm 14, which has pivotally connected thereto one end of a link or connector 15; the other end of the link or connector 15 is pivotally connected to an arm 16, which has its hub loosely mounted on a transverse rod 17. The lever or arm 16 has extending downwardly from its hub, a projection 16'', which extends in the path of and is adapted to be engaged by the inner end of a hook or lever 18, which has a hub or boss 18' at its outer end, which is loosely mounted on a pin 19, carried at the end of an arm 20, which has its hub 20' fast on a short shaft 30 mounted in suitable bearings in the stand 5. The shaft 30 has fast thereon the hub 31' of a lever 31, see Fig. 1; the lever 31 is connected, through a pin 32, to the upper end of an upright lever 33, which has a hub 33' on its lower end, which is fast on the rock shaft 34, which is mounted in suitable bearings at the rear of the breast beam, see Fig. 1. Also fast on the rock shaft 34 is the hub 35' of an upright lever 35. The upper end of the upright lever 35 is made curved, see Fig. 10, to extend into a recess 36' in the rear end of the slide 36 of the side filling fork stop motion. The slide 36 is mounted in a suitable track or way 37 on the upper side of the breast beam, and carries at its inner end the weft fork 38, pivotally mounted on a transverse pin 39. The weft fork 38 has a hook or projection 38' on its inner end, which extends in the path of and is adapted to be engaged by the upper end of the weft hammer 40 of the ordinary stop motion.

When the slide 36 is in its outward position, as shown in Fig. 11, the slide will be held in that position by a latch 41, see Fig. 12, which is pivotally attached to a pin 42 on an extension 37' on the track or way 37, and extends into a notch or recess 36' in the slide 36. A spring wire 43 actuates the latch 41. A plate 36" fast on the upper side of the slide 36 has its inner end beveled or cam-shaped, and is adapted to engage one end of a spring blade 44, see Fig. 11, which is secured on the enlarged end 45' of a rocking pin 45, which is mounted in a bearing 46 on the upward extension 37" on the track or way 37. A pin 47 on the pin 45 is adapted to engage a projection 46' on the bearing 46, to limit the rocking motion of said pin 45. The other end of the spring blade 44 extends under and is adapted to engage a hook shaped arm 38" on the outer end of the weft fork 38, see Fig. 11. The slide 36 has a pin 48 attached thereto, and extending out from one side thereof, see Fig. 9. The pin 48 extends into the upwardly bent fork-shaped end 49' of a rocking wire or rod 49, which is held at its inner end on the upper side of the breast beam 2, by a strap 50, see Fig. 9. The other end 49" of the rocking wire or rod 49 is offset, and bent inwardly, and then outwardly, as shown in Fig. 9. The end 49" of the rocking wire or rod 49 extends into the yoke-shaped end 51' of a vertically moving slide 51, see Fig. 6, which is supported, to have a vertical movement in a track or way in the downward extension 52' on a lever 52, which is pivotally mounted at its outer end on a stud 53 on the underside of the shipper stand or bracket 54, see Fig. 7. The lower end of the vertically moving slide 51 is in the path of and is adapted to engage one end of a lever 55, which is pivotally mounted on the underside of the breast beam on a stud 56. The other end of the lever 55 is adapted to be operated by the center filling stop motion of the loom, not shown, in the ordinary way, which operates to stop the loom in case the filling is broken in the shed.

The rock shaft 34 has fastened thereon, at its outer end, a collar 57, see Fig. 1, carrying a spring blade or plate 58, having a side extension 58' thereon, which is adapted to extend over and engage an outwardly extending projection 59' on a dagger 59, see Figs. 2, and 3, which is pivotally supported on a stud 60 on a downwardly extending arm 61' of the transferrer arm 61, which is mounted on a stud 62. A helically coiled torsion spring 63 acts to raise the transferrer arm 61 in the usual way. The inner end of the dagger 59 is adapted to extend in the path of the bunter 64 carried on the lay, see Fig. 3.

A vertically moving upright rod 65, carries at its upper end a hub 66 having a pin 67 thereon, which is adapted to extend over and engage the upper edge of the dagger 59, see Figs. 2, and 3. The upright rod 65 is attached at its lower end to a lever, not shown, which is operated by a cam, not shown, to communicate a regular up and down motion to the rod 65, at predetermined intervals, and cause the pin 67 to engage the dagger 59, in case said dagger is in its raised position, and move it down out of the path of the bunter 64, against the action of the spring blade 58 which tends to raise said dagger.

The transferrer arm 61 carries at its inner end a pin 68, see Figs. 6, and 7, extending out from one side thereof, on which is loosely mounted the hub 69' of the transferrer 69, which is adapted to engage the head or butt end of the bobbin. The transferrer 69 has an upwardly extending arm 69" carrying a pin 70, which extends into and travels in a slot 6' in the stand 6, see Figs. 6 and 7, to cause said transferrer to properly move to engage the head of the bobbin in transferring the same. The transferrer 69 has attached thereto, in this instance by a set screw 71, the inner end of an arm 72, which is bent downwardly at its outer end 72', and is adapted to engage the tip of the bobbin.

Each shuttle 4 has a plate 4' secured on one side thereof, near the end, see Fig. 5, in this instance by two screws 4". The plate 4' has one opening 4''' therethrough, which is in alinement and registers with an opening in the body of the shuttle. Into the opening 4''' the bent end 73' of an indicating lever 73 is adapted to enter, as the lay beats up. The lever 73 has its hub pivotally mounted on a stud 74, suitably supported, and has an arm 73" which is adapted to rest on a pawl 75, which is pivotally mounted on a stud 76. A lever 77 is pivotally mounted on a stud 78, and has a projection thereon adapted to be engaged by a projection 73''' on the indicating lever 73, and a second projection thereon extending above and in the path of the inner end of the hook 18. A spring actuated pin 79 has its bearings in projections 80' on a stand 80, see Figs. 2, and 3, and extends under the hook 18 at its inner end, and the action of the helically coiled spring 81 around the pin 79, acts to raise said pin 79 and through the raising of said pin, to raise the hook 18, when it is released by the movement of the lever 77 through the movement of the indicator lever 73, as shown in Fig. 3. The raising of the hook 18 brings it into the path of the extension 16" on the lever 13

16, and the longitudinal movement of the hook lever 18, through the movement of the arm 20 and the rock shaft 30, moves the lever 16, and through connector 15 moves the rock shaft 11 carrying the bobbin supports or levers 9 and 10, to move said supports from the position shown in Fig. 2, to the position shown in Fig. 3, thus releasing the lowest bobbin in the compartment, and allowing it to drop down to the discharging end of the magazine.

It will be understood that there are four indicator levers 73, one for each of the four shuttles, and that the holes 4''' through the plates 4' and in the body of the shuttle 4, corresponding to the position of the engaging ends of the indicating levers 73, so that the discharge of a bobbin from each one of the four compartments, is controlled by the indicating lever for the shuttle having a bobbin with filling thereon of a corresponding color or character.

In Figs. 14, and 15 are shown some parts not shown in the other figures, and more particularly the device carried on the lay, and moving therewith, for actuating the cutter in the shuttle, to cut the filling in the running shuttle prior to the complete exhaustion of the filling, as shown and fully described in Letters Patent, No. 914,703, dated March 9, 1909. In said Figs. 14, and 15, 82 is the upper part of the lay-sword, 83 is the hand rail; 84 is the shuttle binder pivoted at its outer end, and having an offset 84' therein near its inner end, for the entrance of the bent ends 73' of the indicator levers 73. 85 is the binder spring, 86 is the binder finger fast on the rock shaft 26. On the plate 87, which forms a specially shaped mouthpiece for the shuttle, is secured an eccentric bolt 88; said bolt 88 is secured by a set screw 89, see Fig. 15, in a boss 87' on the plate 87. On the inner end of the bolt 88 is loosely mounted a latch or trip finger 90; said trip finger, by turning the bolt 88, may be lowered or raised as desired, and as the shuttle 4 enters the box at the right hand end of the loom, is adapted to engage the cam-shaped head 91' on the bolt 91, see Fig. 15, which extends on the top or upper surface of the shuttle. The movement of the bolt 91 moves a cutter blade or knife 92, to sever the filling thread carried into the recess 93' in a plate 93, forming a part of the threading mechanism of the shuttle, all as is fully described in our said application for a patent. The plate 87 has an opening 87' therein for the entrance of the weft fork 38 on the slide 36, to indicate the failure of the filling thread when the filling has been cut, as above described.

From the above description in connection with the drawings, the operation of our improvements will be readily understood by those skilled in the art.

It will be understood that the details of construction of our improvements may be varied if desired.

Having thus described our invention, what we claim as new and desire to secure by Letters Patent is:—

1. In a loom, a lay having a trip, a shuttle having a device to co-act with said trip, to cut the filling after the shuttle has laid a complete pick in the shed.

2. In a loom, a lay having a trip, a shuttle having a cutting or breaking device arranged to be actuated by said trip, filling supply mechanism adjacent one end of said lay, and means, through the instrumentality of the filling fork, to cause the filling changing means to operate.

3. In a loom, a lay, a shuttle, a trip mounted on said lay and arranged to operate a filling cutting or breaking device arranged in said shuttle, said device operating to cut or break said filling after the shuttle has laid a complete pick of filling in the shed, at a point in the unwinding which leaves a predetermined number of picks on the bobbin.

4. In a loom, a lay having a trip, a shuttle having a cutting or breaking device, arranged to be actuated by said trip, a filling changing mechanism, and means through the instrumentality of the filling fork, to cause the filling changing mechanism to operate to supply the shuttle with fresh filling on its return to the filling changing end of the loom.

5. In a loom, a lay, a magazine at one end of the lay, a device to coact with a device in the shuttle to disconnect the filling from its supply after substantially a full trail of filling has been laid in the shed.

6. In a loom, a lay, a filling supply mechanism arranged adjacent to one end of the lay, and means to cause the filling supply mechanism to act on the exhaustion of a complete pick of filling, combined with means to stop the loom.

7. In a loom, a lay, filling supply mechanism adjacent to one end of the lay, a filling fork to cause the filling supply mechanism to operate to supply fresh filling on the exhaustion of the filling in the shuttle, after laying a full pick of filling in the shed, and mechanism to stop the loom on the exhaustion of the filling when the shuttle has failed to lay a full pick.

8. In a loom, a lay, a single shuttle box at one end of the lay, combined with filling changing mechanism adjacent thereto, means to stop the loom on the failure of the shuttle to lay a full pick of filling in the shed combined with means to render the stopping mechanism inoperative on the discontinued use of a filling carrier, after the shuttle has laid a full pick of filling in the shed.

9. In a loom, a lay, a shuttle having a filling cutting or severing device, and arranged to be picked across the lay, a trip mounted on said lay in position to operate said filling cutting or severing device on every alternate pick.

10. In a loom, a lay, shuttle boxes at one end thereof, a stationary filling carrier magazine mounted at the opposite end of said lay, arranged to lower any of the filling carriers obliquely into position, to be transferred from the magazine into the shuttle.

11. In a weft replenishing loom, a magazine having a plurality of compartments for bobbins or filling carriers, the lower part of said compartments extending in a perpendicular plane, and the upper part of said compartments extending in an inclined plane relative to the lower part, to hold the heads and tips of the bobbins in said inclined parts out of line with each other, in the direction of the length of the bobbins.

12. In a weft replenishing loom, a magazine having a plurality of compartments for bobbins or filling carriers, the lower part of said compartments extending in a perpendicular plane, and the upper part of said compartments being inclined outwardly relative to the lower part, to hold the heads and tips of the bobbins in said inclined parts out of line with each other in the direction of the length of the bobbins.

RANDOLPH CROMPTON.
JOHN R. FITTON.

Witnesses:
MARY C. IDE,
GEORGE CROMPTON.